United States Patent Office 2,951,235
Patented Aug. 30, 1960

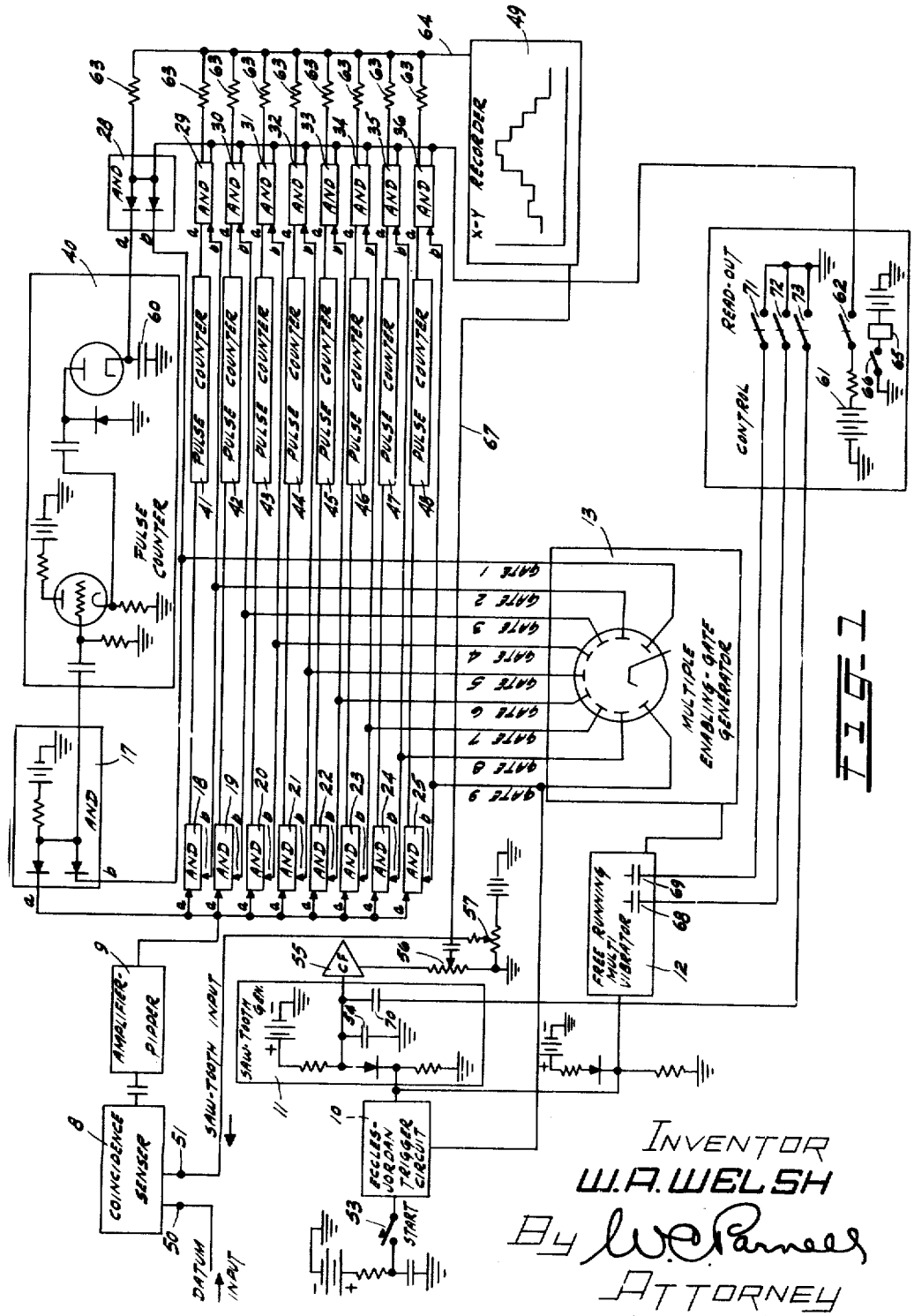

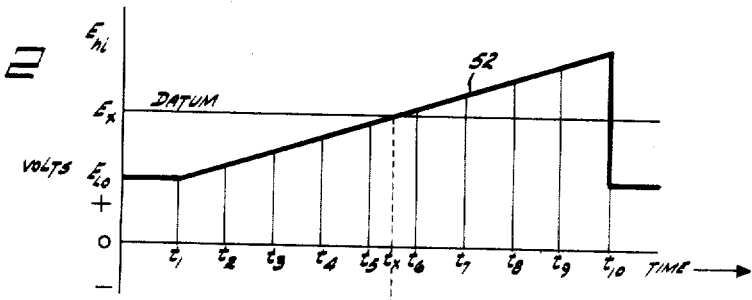
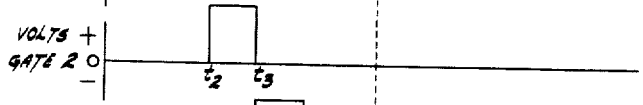
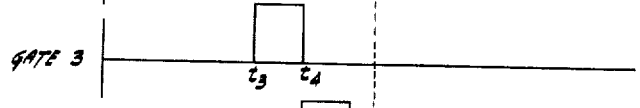
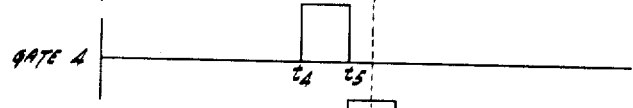
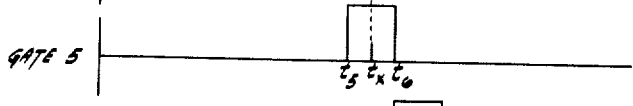

2,951,235
STATISTICAL DATA ACCUMULATOR

Warren A. Welsh, Westfield, N.J., assignor to Western Electric Company, Incorporated, New York, N.Y., a corporation of New York Filed Jan. 15, 1958, Ser. No. 709,027

7 Claims. (Cl. 340—172.5)

This invention relates to a statistical data accumulator and particularly to a system for sorting data, as may be required for effective analysis and control purposes. One specific application of such a device is in production testing of a manufactured product where a distribution analysis is required of the test data for investigative and process control purposes.

The object of the invention is the accumulation and sorting of data for determining the distribution pattern thereof.

According to the general features of the invention, a datum potential and a reference potential varying between the upper and lower limits of the range of variation of the datum potentials, are applied to a coincidence circuit which controls a generator for supplying a pulse simultaneously to a plurality of "And" circuits at the time when the instantaneous value of the reference potential is equal to the datum potential. The "And" circuits are sequentially gated in timed relation with the reference potential so that each "And" circuit is prepared for activation only during a fixed interval when the reference potential passes through a corresponding segment of the range of variation and only the one "And" circuit corresponding to the value of the particular datum potential applied, is activated by a pulse applied by the generator to all of the "And" circuits. Whenever an "And" circuit is activated, it actuates a corresponding one of a plurality of counters which store or accumulate, for subsequent read-out, the total number of times each "And" circuit is activated.

In a preferred embodiment of the invention, the varying reference potential is produced by a saw-tooth generator and the output of the coincidence circuit, when activated, energizes an amplifier and pipper. A pipping pulse is applied to one input of a plurality of double input "And" circuits when the reference potential equals the datum potential. The other inputs of the "And" circuits are sequentially energized or gated in timed relation to the saw-tooth potential by a multiple enabling gate generator so that only one "And" circuit is gated at the time a pipping pulse corresponding to the datum potential is generated. After each bit of data has been processed, sorted and accumulated in the counters, the stored information in the counters is successively released to an "X—Y" recorder for plotting a distribution curve.

These and other features of the invention will be more fully understood from the following detailed description when taken in conjunction with the accompanying drawing, in which:

Fig. 1 is a schematic diagram of a system disclosing the invention as being used, for example, for analyzing data on a series of tests on mechanical components where the results of such tests are represented by a D.C. datum potential;

Fig. 2 is a diagram showing the two inputs to the coincidence circuit of the system of Fig. 1, and Figs. 3 through 11 are curves showing the time distribution of gating pulses applied to the "And" circuits of Fig. 1, utilizing the same time base as Fig. 2.

In the system shown in the drawing, conventional computer components and circuits such as a coincidence senser 8, amplifier-pipper 9, trigger circuit 10, saw-tooth generator 11, free-running, multi-vibrator 12, multiple enabling gate generator 13, "And" circuits 17 through 25, and 28 through 36, counters 40 through 48, and "X—Y" recorder 49 are disclosed generally, but since their design and operation are well known in the art, detailed descriptions thereof are not given, as they are not believed necessary for complete understanding of the invention.

The inputs to the coincidence circuit 8 comprise a D.C. datum potential applied to input 50, and a saw-tooth reference potential applied to input 51. The datum potential may, for example, have a value "$E_x$" as shown in Fig. 2, while the reference potential 52 may vary from a base or low range limit "$E_{lo}$" up to a high range limit "$E_{hi}$." The limit values "$E_{lo}$" and "$E_{hi}$" are selected to cover the range of variation of the measured parameter or datum potentials. When the datum potential is known to be ready for accumulation, an initiating signal is applied, by the closure of a switch 53 to energize an Eccles-Jordan trigger circuit 10 which, in turn, initiates the action of the saw-tooth generator 11 (for example, at time "$t_1$," Fig. 2). A pulse from the trigger circuit 10 unclamps the voltage across condenser 54 and the voltage across this condenser rises in a well-known manner, generating a saw-tooth wave. This voltage is applied to a cathode follower 55 having a potentiometer 56 for adjusting the amplitude of the saw-tooth potential. The saw-tooth potential is superimposed on a D.C. base voltage, in this case, "$E_{lo}$," which is adjustable by a potentiometer 57. This base voltage is provided since the expected variation of the datum voltage may be about an average value other than zero.

At the time of initiation of the saw-tooth wave generation by the operation of the Eccles-Jordan circuit 10, an initiation voltage is also applied by the trigger circuit to the free-running multi-vibrator 12 which, in turn, actuates the multiple gate generator 13 and controls the duration of the gating pulses produced by the generator 13. The gate generator provides a series of similar positive pulses (Figs. 3 through 11) each of which begins at the end of the preceding pulse. Each pulse is transmitted to one input "b" of "And" circuits 18 through 25 inclusively. The multiple gate generator may be of any of the well-known types and may, for example, utilize one of the multi-electrode cold cathode gas tubes now widely used in counting and gating circuits. Such tubes are available with ten or more electrodes, each one of which may be directly connected to a corresponding "And" circuit. A connection is made from the last enabling gate (Gate 9) back to the Eccles-Jordan trigger circuit so that it will be triggered when the last gating pulse has been delivered to "And" circuit 25. This action terminates the saw-tooth by deactivating the generator 11 and stops the multi-vibrator 12. With this arrangement the saw-tooth is made exactly equal in length of time to the sum of the enabling gates, and each of the "And" circuits 17 through 25 is gated only during a fixed time interval when the reference saw-tooth potential passes through a corresponding definite segment of the range of variation.

The output of the coincidence circuit 8 is applied to the input of amplifier-pipper 9 for generating a uniform output pulse of short duration whenever a signal is produced in the output of the coincidence circuit, that is, when the reference potential becomes equal to the datum potential. The output of the pipper is applied to one input "a" of each of the "And" circuits 17 through 25 exclusively.

The number of enabling gates for the "And" circuits 17 through 25 should be equal to the number of segments into which it is desired to accumulate data. Although nine segments have been shown in Fig. 1, it is recognized that a greater or lesser number could be employed, depending on the dictates of the particular application. As each of the "And" circuits receives its enabling gate in sequence at the time of coincidence of the datum potential and the saw-tooth wave, there will be applied one pulse to the inputs "a" of all "And" circuits 17 through 25 and an enabling gate to only one of the inputs "b." For example, at time "$t_x$" shown in Figs. 2 and 7, when the saw-tooth reference potential is equal to the datum potential "$E_x$," a gating pulse is supplied to gate 5 only; consequently, only "And" circuit 21 will be activated. The outputs of the "And" circuits are connected directly to pulse counters 40 through 48, respectively, so that whenever one of the "And" circuits is activated, a pulse will be supplied to the corresponding counter, in this case, counter 44. The pulses produced by the pipper 36 are of uniform size and duration, as are those produced by the enabling gate generator. The pulses transmitted by the activated "And" circuits 17 through 25 to the counters therefore will be uniform. The pulses are accumulated in the counters 40 through 48, as charges in the condenser 60, the counters being of the type where the charge accumulated in condenser 60 is essentially proportional to the number of pulses applied to the input.

The above described operation completes the accumulation of a piece of data. The time required for making each accumulation may be in the order of one millisecond or less. Upon completion of the accumulation of all the required data, the sorted and accumulated data in the counters are displayed on an "X—Y" recorder device, which may be of the electromechanical graphic type or an oscilloscope 49. One of the inputs "a" of each of a second set of "And" circuits 28 through 36 is connected to the outputs of corresponding pulse counters 40 through 48, respectively. The second inputs "b" of these "And" circuits are connected to corresponding gating outputs of the enabling gate generator 13 so that these "And" circuits may be sequentially or successively energized. The "And" circuits 28 through 36 are normally disabled by opening the operating potential source 61 therefor with a normally open switch or contacts 62 of relay 65. The outputs of the "And" circuits 28 through 36 are, when contacts 62 are closed, successively fed through isolation resistors 63 to a common "Y" input 64 of the "X—Y" recorder.

When a read-out control switch 66 is closed, relay 65 operates and contacts 62 render the "And" circuits operative. Successive gating of these circuits then causes successive potentials, proportional to the charges accumulated in each of the counters 40 through 48 to be successive displayed on the recorder. The recorder is swept by the saw-tooth wave form 11, the connection 67 being provided therefor. In the event the recorder is an electromechanical graphic type, it is necessary to change the time length of the enabling gates to be consistent with the response time of the recorder. This is accomplished by switching in additional condensers 68 and 69 in the free-running multi-vibrator 12 and by adding a condenser 70 in the saw-tooth generating circuit by means of additional contacts 71, 72 and 73, respectively, on relay 65.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:
1. A system for accumulating and sorting data represented by electrical potentials comprising a coincidence sensing circuit, means for generating a reference potential varying between the upper and lower limits of the range of variation of the datum potentials, means for applying the varying reference potential and a datum potential to the coincidence circuit, means in the output of the coincidence circuit for generating an electrical pulse when the reference potential is equal to the datum potential, a plurality of double input "And" circuits, a counter connected in the output of each "And" circuit operable when the corresponding "And" circuit activated, means for applying the output of the pulse generator to one of the inputs of each of the "And" circuits, means synchronized with the varying reference potential for generating a series of successive gating pulses, and means for sequentially applying the gating pulses to the other inputs of the "And" circuits to prepare each circuit for activation only during a fixed interval when the reference potential passes through a corresponding segment of the range of variation whereby only the one "And" circuit corresponding to the value of the datum potential is activated when a pulse is generated by the pulse generating means.

2. A system for accumulating and sorting data represented by electrical potentials comprising a coincidence circuit having two inputs and one output for producing a signal in the output only when two potentials applied to the inputs are substantially equal, a plurality of double input "And" circuits, each corresponding to a part of the range of variation of the datum potentials, a pipper in the output of the coincidence circuit for delivering a pulse of predetermined magnitude and time duration whenever a signal is produced in said output, means for generating a potential variable substantially uniformly during a prescribed time interval between the limits of the range of variation of the datum potentials, means for selectively applying the varying potential to one of the inputs of the coincidence circuit, means for applying a datum potential to the other input of the coincidence circuit, means for generating a succession of uniform gating pulses, means for sequentially applying the gating pulses to the other inputs of the "And" circuits, means for synchronizing the application of the gating pulses to the "And" circuits such that the individual circuits sequentially receive a gating pulse only during the time when the varying reference potential passes through a corresponding part of the range, and means in the outputs of each of the "And" circuits for counting pulses produced therein whenever pulses are delivered simultaneously to the two inputs thereto.

3. Apparatus for accumulating data represented by electrical potentials which are functions of the data comprising a coincidence circuit having two inputs and one output for producing a signal in the output only when two potentials applied to the inputs are of substantially identical magnitudes, a plurality of double input "And" circuits, each corresponding to a part of the range of variation of the datum potentials, a pipper in the output of the coincidence circuit for delivering a pulse whenever a signal is produced in said output, means for generating a potential variable substantially uniformly during a prescribed time interval between the limits of the range of variation of the datum potentials, means for selectively applying the varying potential to one of the inputs of the coincidence circuit, means for applying a datum potential to the other input of the coincidence circuit, means for generating a succession of uniform gating pulses for the "And" circuits, means for sequentially applying the gating pulses to the other inputs of the "And" circuits, means for synchronizing the application of the gating pulses to the "And" circuits such that individual circutis receive a gating pulse only during the time when the varying potential applied to the input of the coincidence circuit passes through a corresponding part of the range, means in the outputs of each of the "And" circuits for counting pulses produced therein whenever pulses are delivered simultaneously to the two inputs thereto, and means responsive to the counters for visually displaying the information accumulated in each counter resulting from a plurality of operations of the device.

4. Apparatus according to claim 3 in which the means for visually displaying the information accumulated in each counter comprises a second plurality of double input "And" circuits, means connecting the output of each of the counting means to one of the inputs of a corresponding one of said "And" circuits, a graphic "X—Y" recorder means connected in the outputs of the second plurality of "And" circuits, means for sequentially applying actuating pulses to the other inputs of the second plurality of "And" circuits and means synchronized with the reference potential for sweeping the signal applied to the recorder from the counters.

5. A system according to claim 1 in which the means for generating the reference potential comprises a saw-tooth generator and means in the output of the generator for biasing the saw-tooth waves generated thereby.

6. A system according to claim 5 in which the means for generating the series of gating pulses comprises a multiple enabling gate having individual outputs connected to each of the "And" circuits, a free-running multi-vibrator for actuating the enabling gate and for controlling the duration of the gating pulses, and a trigger circuit for simultaneously initiating the operation of the saw-tooth generator and the multi-vibrator.

7. A system according to claim 6 having means responsive to one of the gating pulses produced by the enabling gate for actuating the trigger circuit to deactivate the saw-tooth generator and the multi-vibrator.

References Cited in the file of this patent
UNITED STATES PATENTS

| | | |
|---|---|---|
| 2,700,501 | Wang | Jan. 25, 1955 |
| 2,717,994 | Dickinson et al. | Sept. 13, 1955 |
| 2,736,006 | Langevin | Feb. 21, 1956 |
| 2,759,784 | Burke | Aug. 21, 1956 |